United States Patent [19]
Holladay

[11] Patent Number: 5,898,822
[45] Date of Patent: Apr. 27, 1999

[54] USING THE PHASE INFORMATION IN THE HALFTONE DOT STRUCTURE TO MINIMIZE ARTIFACTS WHEN SWITCHING BETWEEN HALFTONE DOTS ON A SCAN LINE

[75] Inventor: Thomas M. Holladay, Webster, N.Y.

[73] Assignee: Xerox Corporation, Stamford, Conn.

[21] Appl. No.: 08/826,177

[22] Filed: Mar. 27, 1997

[51] Int. Cl.$^6$ .......................... H04N 1/405; H04N 1/409
[52] U.S. Cl. ...................... 395/109; 382/237; 382/275; 358/456; 358/463; 358/298
[58] Field of Search .................... 382/237, 270, 382/275; 358/456, 457, 466, 454, 458, 459, 298, 533, 534, 535; 395/109

[56] References Cited

U.S. PATENT DOCUMENTS

| | | | |
|---|---|---|---|
| 4,149,194 | 4/1979 | Holladay | 358/298 |
| 5,045,952 | 9/1991 | Eschbach | 358/466 |
| 5,226,094 | 7/1993 | Eschbach | 358/456 |

OTHER PUBLICATIONS

An Adaptive Algorithm for Spatial Grayscale by Floyd and Steinberg, Proceedings of the SID 17/2, 75–77 (1976).

"Using Peano Curves for Bilevel Display of Continuous-tone Images", by Witten et al., IEE Comp. Graph and App. vol. 2, No. 5, pp. 47–52 (1982).

"Naive Halftoning" by A.J. Cole, Proceedings of CGI '90, Springer Verlag pp. 203–222 (1990.

"Three Plus Five Makes Eight: A Simplified Approach to Halftoning" by Wyvill et al., Proceedings of CGI '91 Scientific Visualization of Physical Phenomena, pp. 379–392 (1991).

"Digital Halftoning with Space Filling Curves" by L. Valhi et al, Computer Graphics, vol. 24 No. 4, pp. 81–90 (1991).

*Primary Examiner*—Scott Rogers

[57] ABSTRACT

A method of reducing visible image artifacts that utilizes variable phase parameters (i.e., the standard x, y start position in halftone cells) during halftoning processes to match the phases of halftone cells, and further utilizes a brick approach to halftoning. The position in a halftone dot structure is correlated to the phase of sine waves for subsequent dots to be used in a halftoning process. Utilizing a selected x, y start position in halftone cells to match phase parameters of said halftone cells according to said position of said halftone dot and said subsequent dots. Switching from one dot to another dot on the same new starting position in the second dot will improve the probability that the thresholds and the slopes of the halftone dots are matched at the boundary between the two different dots.

5 Claims, 4 Drawing Sheets

USING THE PHASE INFORMATION IN THE HALFTONE DOT STRUCTURE TO MINIMIZE ARTIFACTS WHEN SWITCHING BETWEEN HALFTONE DOTS ON A SCAN LINE

FIELD OF THE INVENTION

The invention is generally related to halftoning processes and, more particularly, the invention is related to the utilization of phase parameters during halftoning processes to match the phases of the halftone cells and applying a brick approach to halftoning, thereby minimizing visible image artifacts.

BACKGROUND OF THE INVENTION

Encoding methods, commonly called halftoning, are used to reduce the number of quantization levels per pixel in a digital image while maintaining the gray appearance of the image at normal reading distance. Halftoning techniques are widely employed in the printing and display of digital images. Halftoning techniques are necessary because the physical processes involved are binary in nature or the processes have been restricted to binary operation for reason of cost, speed-memory, or stability in the presence of process fluctuations. Examples of such processes are: most printing presses; ink jet printers; binary cathode ray tube displays; and laser xerography.

In the digital reproduction of documents, image information, be it color, black, or white, is commonly generated in a bitmap format where the bitmap comprises a plurality of continuous tone or gray level pixels, i.e., pixels that are defined by digital values, each value representing a gray level among a number of gray levels. Thus, in an 8 bit system, 256 levels of gray are present, where each level represents an increment of gray between white and black. Each separation includes 256 levels of information and there may be more than 16 million colors defined by a gray bitmap. Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is a limited number of levels that are printable. Besides gray level information derived by scanning, certain processing techniques such as those described, for example, in U.S. Pat. No. 5,226,094 to Eschbach, may produce gray level data requiring quantization for printing.

A standard method of quantizing gray level pixel values to binary level pixel values is through dithering or screening processes. In such arrangements, over a given area having a number of gray pixels therein, each pixel value of an array of gray level pixels within the area is compared to one of a set of pre-selected thresholds as taught, for example, in U.S. Pat. No. 4,149,194 to Holladay. The effect of such an arrangement is that, for an area where the image is gray, some of the thresholds within the screen matrix will be exceeded, i.e., the image value at that specific location is larger than the values stored in the dither matrix for that same location, while the remaining elements are allowed to remain white, dependent on the actual physical quantity described by the data. The effect of the distribution of black and white over the halftone cell is integrated by the human eye as gray. A trade-off is required between the number of gray level increments representable by a screen cell, versus the size or frequency of the cell. While it is desirable to have as many gray levels as possible representable by a screen cell, such a requirement increases the size of the cell until its repetition across an image becomes visible. However, with a smaller cell, which can be repeated at high frequency across a page, only a relatively small number of gray levels can be represented.

Algorithms that convert gray images to binary or other number of level images without repeating patterns exist, and include among them error diffusion, as taught, for example, in "An Adaptive Algorithm for Spatial Grayscale" by Floyd and Steinberg, Proceedings of the SID 17/2, 75–77 (1976). Another more elaborate error diffusion technique is taught by U.S. Pat. No. 5,045,952 to Eschbach. Error diffusion tends to suffer from a characteristic "worming" defect. One method of reducing the worming artifact in an error diffusion process that has been noted is to distribute error along a space filling curve, such as Hilbert, Peano or Murray Curves. See, for example, "Using Peano Curves for Bilevel Display of Continuous-tone Images", by Witten et al., IEEE Comp. Graph. and App. Vol. 2, No. 5, pp. 47–52 (1982); "Naive Halftoning" by A/J/ Cole, Proceedings of CGI '90, Springer Verlag pp. 203–222 (1990); and "Three Plus Five Makes Eight: A simplified Approach to Halftoning" by Wyvill et al., Proceedings of CGI '91 Scientific Visualization of Physical Phenomena, pp. 379–392 (1991). Unfortunately, space filing curves present complex processing order, see, for example, "Digital halftoning with Space Filling Curves" by L. Valhi et al., Computer Graphics, Vol. 25 No. 4, pp. 81–90 (1991), while, in view of the operation of printers and most image processors, it would be highly desirable to work in scan line order. Error diffusion is often unusable by certain reproduction processes, such as electrophotography, because it tends to produce isolated spots that are not reproducible. In such, cases, screening is used with threshold sets arranged to cluster spots together into larger printable dots. Error diffusion is also an inherently sequential process that does not lend itself to parallel processing, while screening.

Even with the implementation of halftoning techniques to digital image processing, the appearance of visible image artifacts still exists in a rendered image. During object oriented halftoning an artifact is created which is very visible to the eye when the halftone dot structure is switched in the middle of the line. In rendering images, the need arises to halftone different objects with different halftone dots, depending upon the classification of the object, such as text, pictures, etc. When doing this it is required that multiple halftone dots are to be used. As currently done this generates an objectionable artifact at the boundary between the two halftone dots. Therefore, the object of this invention is to provide a method of minimizing visible image artifacts on rendered images.

All of the references cited herein are incorporated by reference for their teachings.

SUMMARY OF THE INVENTION

In order to achieve the foregoing and other objects, and to overcome the shortcomings discussed above, a method of using phase information in the halftone dot structure of an image in a manner that minimizes artifacts that occur in an image when switching between halftone dots on a scan line is presented. Inherent to the halftoning process are phase parameters, which if considered, can greatly diminish image artifacts. These phase parameters are the start position in all halftone cells. Using the x, y start position in the halftone cells all the phase parameters of halftone cells are matched, thereby minimizing most artifacts that occur when switching between halftone dots on a scan line. Using a standard brick approach for variables angles of halftoning, nothing more is required than the x, y start position in the halftone cells.

There are two positions, x and y, which must be remembered. The positions in the halftone dot structures can be correlated to the phase of the sine waves for all of the different dots to be used before starting the halftone process.

Switching from one dot to another dot on the same new starting position in the second dot will improve the probability that the thresholds and the slopes of the halftone dots are matched at the boundary between the two different dots.

In the brick approach to halftoning, there is inherently a phase relationship between the two starting positions in the halftone brick description and the underlying dot structure. A sine wave could be fit to the hills and valleys of the halftone dot structure, with the minimum threshold set to the lowest halftone threshold and the highest spot of the sine wave to the highest halftone dot threshold. The halftone threshold array is just an approximation to this sine wave. Starting at different positions inside the halftone dot brick is equivalent to starting at different positions on the sine wave.

The halftone dot can be shifted to start at any position by shifting the x, y start positions in the halftone dot. If the same dot is used to halftone everything on the line, then the start positions in the halftone dot doesn't make any difference. However, if multiple dots are used on the same line, it is highly likely that the phase of the ending mismatch creates an objectionable artifact where these two halftone dots meet. If halftoning on a line, the ending positions of one halftone dot is saved as phase parameters (i.e., the same position and slope on the sine wave through the dot structure), and are matched to the next dot, objectionable artifacts should be greatly reduced at the border between the two different halftone dots. Thus, this method should minimize artifacts along the borders of halftone dots.

The method of the invention comprises: correlating the position in a halftone dot structure to the phase of sine waves for subsequent dots to be used in a halftoning process; utilizing a selected x, y start position in halftone cells to match phase parameters of said halftone cells according to said position of said halftone dot and said subsequent dots; and switching from one dot to another dot on the same new starting position in the second dot will improve the probability that the thresholds and the slopes of the halftone dots are matched at the boundary between the two different dots.

The method can be carried out in a system comprising a microprocessor programmed to correlate the position in a halftone dot structure to the phase of sine waves for all dots to be used in halftoning by utilizing an x, y start position in halftone cells to match all phase parameters of halftone cells, and further programmed for switching from one dot to another dot on the same new starting position in the second dot will improve the probability that the thresholds and the slopes of the halftone dots are matched at the boundary between the two different dots. Rendering means known in the art can be utilized for presenting the halftoned image having matched phase parameters within said halftone cells. The microprocessor may also be programmed to utilize a brick approach for variable angles of halftoning wherein halftone cells are started at x, y start positions within halftone dot bricks.

The advantage of the invention are the reduction of noticeable artifacts during image processing operations which involve halftoning.

Other objects, advantages, and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAIL DESCRIPTION OF THE INVENTION

Figure 1A:
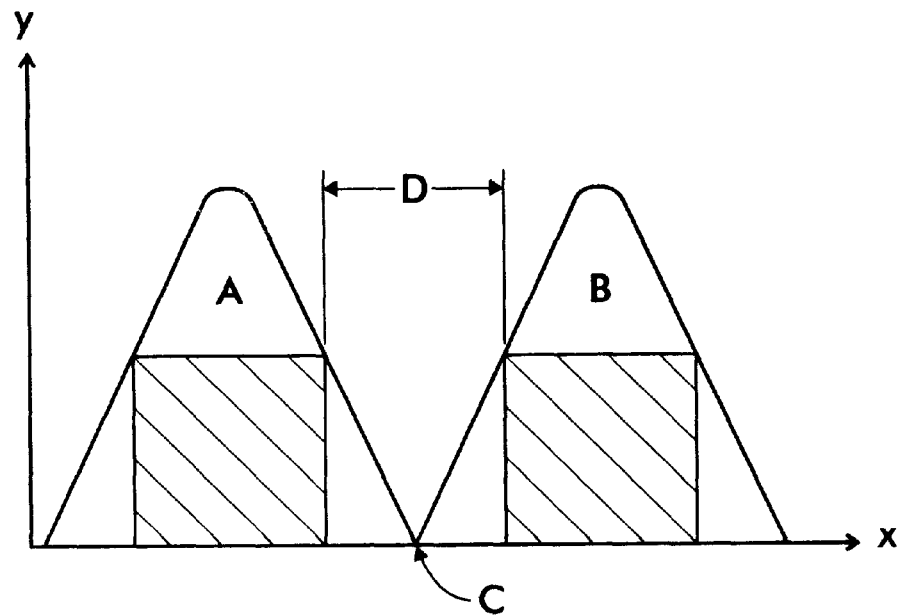
FIGS. 1A and 1B are graphical illustration of the process of matching phase parameters of halftone cells.
Figure 1B:
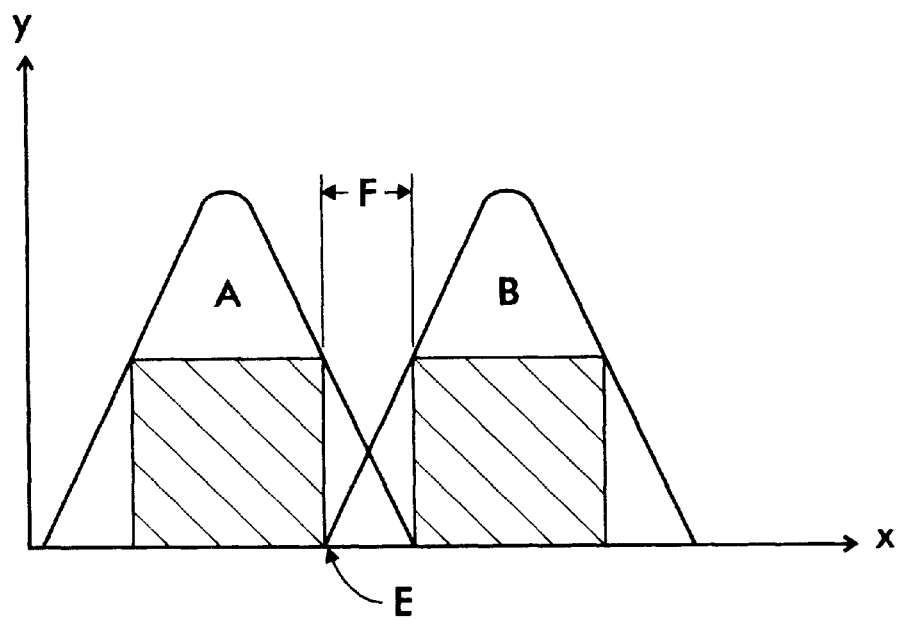

Normally, the halftone dot is phased to the left and top borders by setting the halftone dot starting position (i.e., x and y start positions) both to 1. Usually when phased to the left border, the halftone dot is repetitively duplicated until the image is finished on the right hand side of the image. However, the halftone dot can be shifted to start at any position by shifting the x, y start positions in the halftone dot. If the same dot is used to halftone everything on the line, then the start positions in the halftone dot doesn't make any difference. However, if multiple dots are used on the same line, it is highly likely that the phase of the ending mismatch creates an objectionable artifact where these two halftone dots meet. If halftoning on a line, the ending positions of one halftone dot is saved as phase parameters (i.e., the same position and slope on the sine wave through the dot structure), and is matched to the next dot, these objectionable artifacts should be greatly reduced at the border between the two different halftone dots. Through the invention, using the x, y start position in the halftone cells, all the phase parameters of halftone cells are matched, thereby minimizing most artifacts that occur when switching between halftone dots on a scan line Referring to FIG. 1A and 1B, two halftone dots are illustrated as partial sinusoidal waveforms on a x and y axis. In FIG. 1A, halftone dot A represents the area within the waveform, however only a portion of the halftone dot is being utilized as represented by the shaded area in dot A. Halftoned dot B is represented by the second curve wherein, again only a portion of the dot is being utilized as represented by the shaded area. It is at point C that halftoned dot A ends and halftoned dot B typically begins. The area represented by the space D between the shaded areas is the cause for image artifacts which the invention is directed at overcoming. Referring to FIG. 1B, the positions in the halftone dot structures are correlated to the phase of the sine waves for all of the different dots to be used before starting the halftone process. Switching from one dot A to another dot B with a new starting position in the second dot will improve the probability that the thresholds and the slopes of the halftone dots are matched at the boundary between the two different dots. The starting position E for dot B begins within dot A at the edge of the shaded area within dot A. The area F between dots A and B is therefore reduced. Thus, this method should minimize artifacts along the borders of halftone dots and result in a image with greatly reduced artifacts as illustrated in the image of FIG. 4.

The essential points of this method to accomplish minimizing artifacts when switching between halftone dots on a scan line wherein artifacts are minimized along the borders of halftone dots, are: correlating the position in a halftone dot structure to the phase of sine waves for subsequent dots to be used in a halftoning process; utilizing a selected x, y start position in halftone cells to match phase parameters of said halftone cells according to said position of said halftone dot and said subsequent dots; and switching from one dot to another dot on the same new starting position in the second dot will improve the probability that the thresholds and the slopes of the halftone dots are matched at the boundary between the two different dots. Finally, the brick approach to halftoning is utilized to start the halftone cells at different positions within a halftone dot brick. Using a standard brick approach for variables angles of halftoning, nothing more is required than the x, y start position in the halftone cells. In the brick approach to halftoning, there is inherently a phase relationship between the two starting positions in the halftone brick description and the underlying dot structure. A sine wave could be fit to the hills and valleys of the halftone dot structure, with the minimum threshold set to the lowest halftone threshold and the highest spot of the sine wave to the highest halftone dot threshold. The halftone threshold array is just an approximation to this sine wave. Starting at different positions inside the halftone dot brick is equivalent to starting at different positions on the sine wave.

Figure 2:
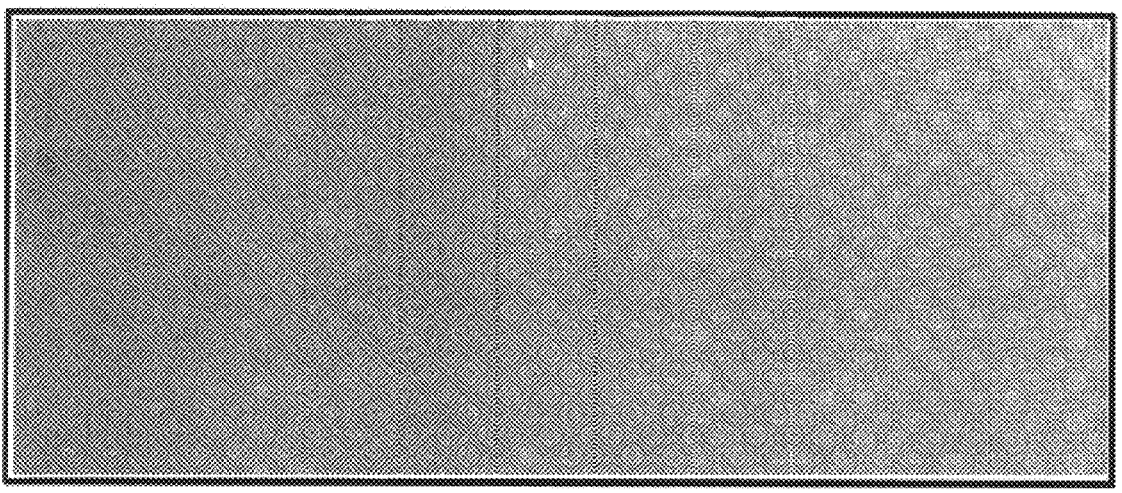
FIG. 2 is an illustration of a halftoned image wherein 11 different phase shifts were created.
Figure 3:
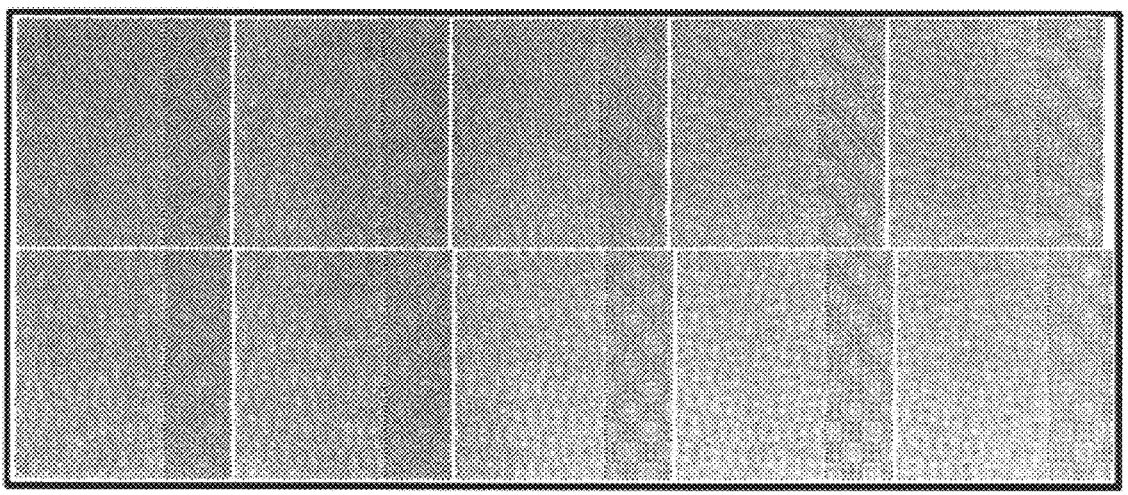
FIG. 3 is an illustration of a halftoned image wherein the phase of 10 images representing squares are changed successively by 1 pixel.
Figure 4:
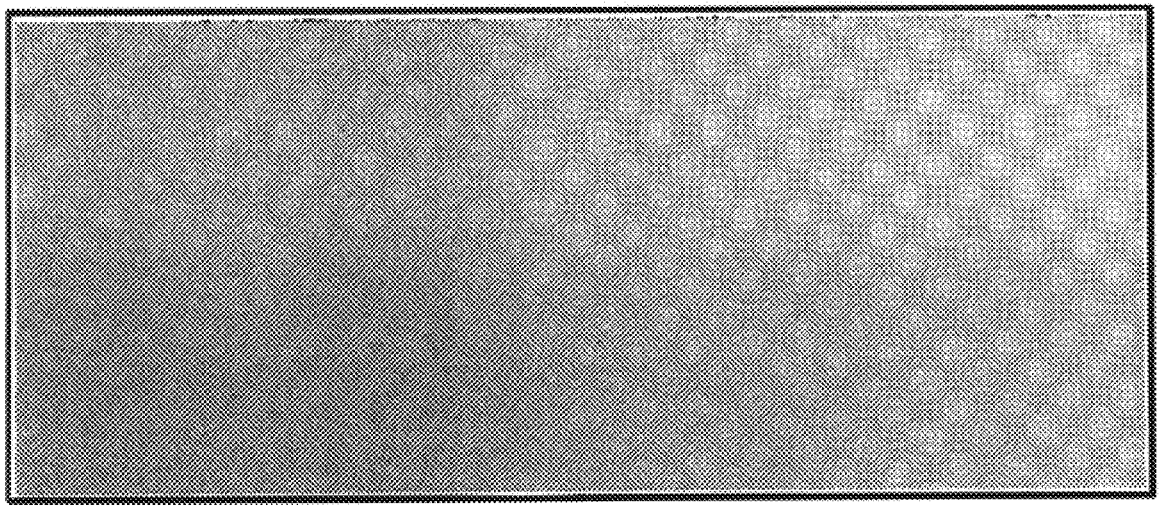
FIG. 4 is an illustration of a halftoned image wherein matching of phase parameters is accomplished resulting in an enhanced, low artifact presentation.

Referring to FIGS. 2–4 various halftoned, phase shift effects are illustrated. In FIG. 2, 11 different phase shifts were created, with both ends of the image starting and ending with a zero phase shift which is not visible. However, the remaining successive 9 phase shifts are clearly visible. The phase shift are a multiple of the halftone cell (i.e., in this case 10) plus an arbitrary number of pixels. The visible artifacts in the middle image have shifts of 1 to 9 pixels inclusive. On the left border the first visible line appears as a white line and on the right of the middle image as a thin black line with very visible artifacts in the middle. In the middle image all of the artifacts shown are all done with the same halftone dot. In FIG. 3, there are 10 squares each having a 5, 4 dot on the left side and a 5, 5 dot on the right side. The unit cell of the 5, 4 dot is 41 pixels and of the 5, 5 dot is 10 pixels. The phase of the 10 images from left to right, top to bottom, in the x direction, changes successively by 1 pixel. However, the phase of the vertical edge, which is difficult to adjust with available programs, is allowed to vary down its vertical length. Looking down each edge, the phase shifts from bad to good along the vertical length. The matching capabilities of the halftone dots can be seen in the middle sub-image of the bottom row of the bottom image in the middle of the vertical line. This region has a good match over a several unit cell length. The other 10 sub-images also have similar regions at different positions down the vertical edges. Finally referring to FIG. 4, by switching from one dot to another dot with a new starting position in the second dot improves the probability that the thresholds and the slopes of the halftone dots are matched at the boundary between the two different dots, resulting in minimized artifacts along the borders of halftone dots and result in a image with greatly reduced artifacts.

Figure 5:
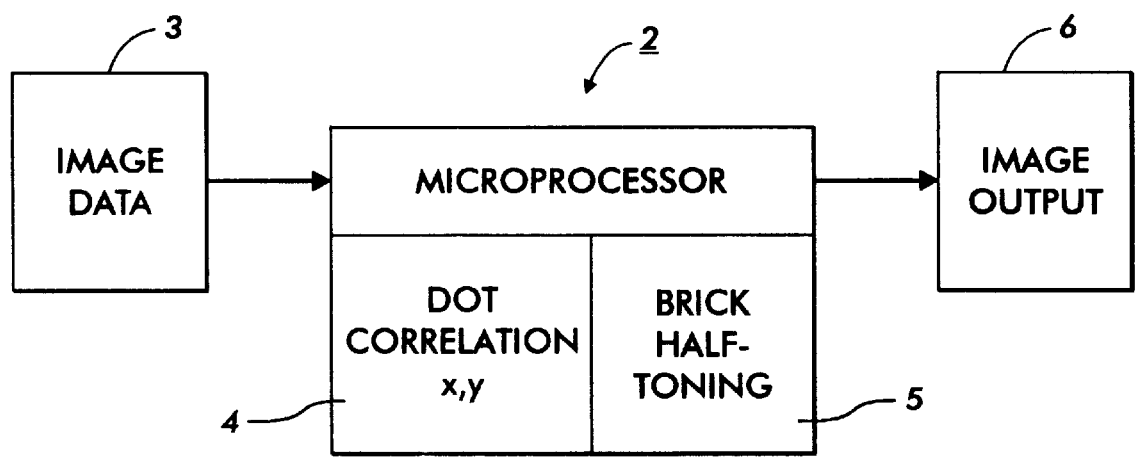
FIG. 5 is a block diagram illustration of a system used to carry out the invention.

Referring to FIG. 5, the invention can be carried out through a system including a microprocessor 2, which after receiving image data from an input data means 3, is programmed to correlate 4 the position in a halftone dot structure to the phase of sine waves for all dots to be used in halftoning by utilizing an x, y start position in halftone cells to match all phase parameters of halftone cells, and programmed to switch from one dot to another dot on the same new starting position in the second dot to improve the probability that the thresholds and the slopes of the halftone dots are matched at the boundary between the two different dots. The microprocessor 2 is also programmable to utilize the brick halftoning 5 approach as described above. Rendering means 6 for presenting a halftoned image resulting from the invention, such as printers and plotters, are well known in the art.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

I claim:

1. A method for minimizing artifacts when switching between halftone dots on a scan line wherein artifacts are minimized along borders of halftone dots, comprising:

correlating a position in a halftone dot structure to sine wave phases for subsequent dots to be used in a halftoning process;

utilizing a selected x, y start position in halftone cells to match phase parameters of said halftone cells according to said position of said halftone dot and said subsequent dots; and switching from one dot to a second dot on a same new starting position in a second dot to improve the probability that thresholds and the slopes of said halftone dots are matched at said boundary between said two dots.

2. The method of claim 1 further comprising utilizing a brick approach to halftoning to start said halftone cells at different positions within a halftone dot brick.

3. A method for minimizing artifacts when switching between halftone dots on a scan line wherein artifacts are minimized along the borders of halftone dots, comprising:

correlating a position in a halftone dot structure to sine wave phases for subsequent dots to be used in a halftoning process;

utilizing a selected x, y start position in halftone cells to match phase parameters of said halftone cells according to said position of said halftone dot and said subsequent dots;

utilizing a brick approach to halftoning to start halftone cells at different positions within a halftone dot brick; and switching from one dot to a second dot on the same new starting position in a second dot to improve the probability that the thresholds and the slopes of the halftone dots are matched at the boundary between the two different dots.

4. A system for minimizing artifacts long the borders of halftone dots, comprising:

a) a microprocessor programmed to:
      i) correlate the position in a halftone dot structure to the phase of sine waves for all dots to be used in halftoning by utilizing an x, y start position in halftone cells to match all phase parameters of halftone cells; and
      ii) switching from one dot to another dot on the same new starting position in the second dot will improve the probability that the thresholds and the slopes of the halftone dots are matched at the boundary between the two different dots; and a rendering means for presenting a halftoned image having matched phase parameters within said halftone cells.

5. The system of claims 4 wherein said microprocessor is further programmed to utilize a brick approach to halftoning to start halftone cells at said x, y start position within halftone dot bricks.

* * * * *